(12) United States Patent
Baber et al.

(10) Patent No.: US 7,390,140 B2
(45) Date of Patent: Jun. 24, 2008

(54) MARINE PIER SYSTEM

(76) Inventors: Roger Baber, 1014 NW. Pine Lake Dr., Stuart, FL (US) 34994; Bruce Jerner, 110 SW. 5th St., Stuart, FL (US) 34994

( * ) Notice: Subject to any disclaimer, the term of this patent is extended or adjusted under 35 U.S.C. 154(b) by 201 days.

(21) Appl. No.: 11/195,059

(22) Filed: Aug. 1, 2005

(65) Prior Publication Data
US 2007/0025816 A1    Feb. 1, 2007

(51) Int. Cl.
*E01B 26/00*    (2006.01)
(52) U.S. Cl. ............................... 405/2; 104/124; 238/13
(58) Field of Classification Search ............ 405/1, 405/2; 104/124–126, 288; 238/13; 105/453
See application file for complete search history.

(56) References Cited

U.S. PATENT DOCUMENTS

| | | |
|---|---|---|
| 41,426 A | 2/1864 | Edwards |
| 89,201 A | 4/1869 | Cogsil |
| 116,059 A | 6/1871 | Humphreys |
| 189,020 A | 4/1877 | Colby |
| 189,171 A | 4/1877 | Avery, Jr. et al. |
| 2,564,951 A | 8/1951 | Blagden |
| 3,587,874 A * | 6/1971 | Graf ............................ 414/678 |
| 4,174,013 A | 11/1979 | Yago |
| 4,352,597 A | 10/1982 | Kay |
| 4,507,016 A | 3/1985 | Honour, VII |
| 4,718,301 A | 1/1988 | Friedrich |
| 4,794,865 A | 1/1989 | Lindberg |
| 5,829,357 A | 11/1998 | Coppens |
| 5,860,364 A * | 1/1999 | McKoy ........................ 104/59 |
| 6,155,177 A * | 12/2000 | Backfisch ..................... 104/126 |
| 6,182,597 B1 | 2/2001 | Maxwell et al. |
| 6,264,330 B1 | 7/2001 | Walton et al. |
| 6,431,082 B1 | 8/2002 | Kummeter et al. |
| 6,848,879 B2 | 2/2005 | Odorizzi |

FOREIGN PATENT DOCUMENTS

DE          3443827 A1 *    6/1985

* cited by examiner

*Primary Examiner*—Sunil Singh
(74) *Attorney, Agent, or Firm*—McHale & Slavin, P.A.

(57) ABSTRACT

A marine pier system employing a payload transport device for transporting persons and material from land to marine craft moored at a distal end of the pier. The payload transport is a movable deck having an electric motor powered by batteries for use in moving the deck and persons/material placed on the deck. The payload transport device is self-contained allowing freedom of movement along a support system eliminating the necessity for decking along the length of the pier. The absence of decking provides a structure upon which wind and wave action and deterioration from sunlight and weathering has little destructive effect, and further allows sunlight to reach the aquatic life below the surface of the water. The movable transport device further permits sunlight to reach all areas of sea grass that are shaded by movement of the transport device to a non-sensitive area when not in use.

12 Claims, 4 Drawing Sheets

MARINE PIER SYSTEM

FIELD OF THE INVENTION

The present invention relates to docking of marine craft and, more particularly, to a marine pier system having a carriage supported by a fixed track having a proximal end secured to dry land and mounted on pilings for extension over water. The carriage can be used to transport people, supplies, and any other items along the length of pier to access marine craft moored along a distal end of the marine pier. The carriage provides for a movable deck enabling the convenience of a conventional pier without the disadvantages.

BACKGROUND INFORMATION

Piers are used to provide access to sail boats, power boats, jet skis and the like marine craft. Piers, also referred to as "docks", are available in a variety of configurations. The main objective of a pier is to provide a structure where marine craft can make fast when not in use. Marine craft are typically secured to a pier by use of lines fastened to cleats secured to the marine craft and to the pier. The pier provides a structure that extends from the edge of land to a distance over water. The distance may be short, so as to clear a bulkhead, or relatively long for mooring of large vessels in deeper water. A conventional pier consists of vertical pilings that are coupled together by the use of tie boards or stringers. Decking is placed over the stringers to create a safe walking area. The decking can consume a large surface area over the surface of the water, which exposes the decking to the destructive forces of weather, wind and waves. For instance, the decking can act as a sail in high winds. Further should the water be rough due to high winds or large boat wakes, waves that strike the deck may result in a similar destructive reaction. Many piers include break away decking to relieve the stress on the pilings during high waves. However, the break away decking can then become a dangerous floating object, as well as an expense and inconvenience to replace.

A large deck also creates an adverse environmental impact in many environmentally sensitive areas. For example, decking typically consists of individual planks that are spaced to prevent a person from tripping on an uneven surface. Thus, a properly designed dock has minimal spacing which has the detrimental effect of preventing sunlight from reaching the water. Without sunlight, vegetation such as sea-grass cannot grow. This has an adverse impact on the aquatic animal life and is currently heavily regulated in many states, the loss of sea-grass having a detrimental effect on all aspects of marine life.

Another problem with conventional piers is security since it allows easy access for unauthorized persons to approach marine craft moored thereto. Large decking makes it easy for a thief to access the marine craft and provides a platform for removing large items such as televisions, fishing gears, and so forth.

Prior art attempts to address these problems include, for example, the use of a mono-rail guided pier cart to move elderly along the length of a pier. The pier cart can be battery powered to provide a portable motorized "people movers" which run on wheels along the decking of a pier. The pier cart operates as addition to a conventional pier and does not address wind, waves, security or the continuing harm caused by decking that shades the water.

U.S. Pat. No. 6,182,597 issued to Maxwell et al., discloses a boat launch apparatus for moving various sized trailers up and down an incline. The boat launch apparatus uses a winch for pulling a trailer along a rail for launching of marine craft.

U.S. Pat. No. 2,564,951 issued to Blagden discloses a moveable shelter for boats. A marine craft is suspended within a boat house and when desired, the boat house is run down a railway and the boat is lowered into the water.

U.S. Pat. No. 4,507,016 issued to Honour discloses a marine rail system which includes a rail assembly of parallel ramped rails, a winch supporting a steel cable at one end, carriages with a torque tube connecting the carriages. The torque tube consists of three members, two of the members being telescoping with respect to the third member. A cable is secured to the forward carriage to pull the carriage along the rail assembly. U.S. Pat. No. 41,426 to Edwards disclose a similar marine railway system.

U.S. Pat. No. 4,352,597 issued to Kay discloses a pier having spaced facing side channels slidably receiving platform modules, the edges of the modules being within the channels, and the channels being tied together by elongated eye-bolt elements which extend through the positioned platform modules.

U.S. Pat. No. 89,210 to Cogsil discloses a railway track running along the bed or bottom of a river, from shore to shore, upon which runs a carriage. On top of the carriage (above the water-line and at the level of the railway or road) are laid one or more tracks of the same gauge as that on the shore or in the case of a common road, a platform only. Cars or vehicles to be ferried across the water upon the carriage are moved from shore to shore by the application of any desired power means.

U.S. Pat. No. 116,059 to Humphreys discloses a railway which consists of wooden piles on which are mounted caps d. Attached to the caps are rails, the rails are double headed. Upper carrying wheels support the rolling-stock and griping wheels provide additional grip when required.

Such prior art systems fail to teach or disclose a marine pier system which is not susceptible to destructive wind and wave action, or provide a pier which will improve the environment by allowing the growth of sea-grasses below a support structure. Security of the marine craft moored to the pier or pier is a further issue the prior art fails to address.

BRIEF DESCRIPTION OF THE INVENTION

The instant invention is directed toward a pier assembly constructed from a plurality of pilings that extend the length of a desired pier. The piling supports a rail system having a proximal end attached to the land and a distal end extending out over the water. At least one payload transport device is movable along the length of the rail system for transporting persons and material to or from a vessel that is docked along a distal end of the assembly.

The payload transport device includes a propulsion system, e.g. at least one electric, diesel or gasoline powered motor, and a mounting means for placing the payload transport device in translational engagement with the payload traversal means. A drive train is constructed and arranged to transmit a propulsive force from the motor to the mounting means to enable reciprocal translational movement along the longitudinal axis of said payload traversal means.

Thus it is an objective of the instant invention to provide a pier assembly having minimal decking to avoid the wind and wave action, exemplified by a hurricane, detrimental to conventional decking.

Another objective of the instant invention is to provide a pier with a small deck to eliminate the environmental impact on the area in which it is located.

Yet another objective of the instant invention is to provide a pier with increased security to prevent unauthorized persons from accessing boats and other water craft moored along the pier.

Still another objective is to lessen the impact on the environment by providing a deck that can be moved to prevent constant shading of the water. By way of example, Florida currently has strict evaluation for new piers pending evaluation of the impact upon the marine environment, namely caused by shading of the sea grass. Not only does the instant invention provide a carriage having a small foot print in shading, the carriage can be placed on a timer and moved so that no area is shaded for any length of time.

Another objective of the invention is to provide a tremendous cost savings in pier construction, maintenance and replacement, by eliminating the need for decking placed along the length of the pier, and lessening the need for support pilings since the removal of decking eliminates safety engineering required for excess loading during storms.

Still another objective of the invention is to address the problem with permits by eliminating the shading typically of conventional decking mounted on piers.

Yet still another objective of the invention is to provide a removable deck to prevent damage to the pier during storm conditions and eliminate debris typical of damaged piers after battering from a storm.

Another objective is to lower insurance premiums and claims by providing a pier that can be secured or locked down close to shore to remove access to marine craft from land, and assure that those who enter the decking without authorization are in a shallow area.

Yet still another objective of the invention is to provide a carriage that can include a roof, railing, gates and other safety items which would be cost prohibitive if extended along the length of a conventional pier.

Yet another objective of the invention is to enhance the waterways by eliminating of piers that fall into disrepair by use of carriage structures that are smaller and thus easier to maintain.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
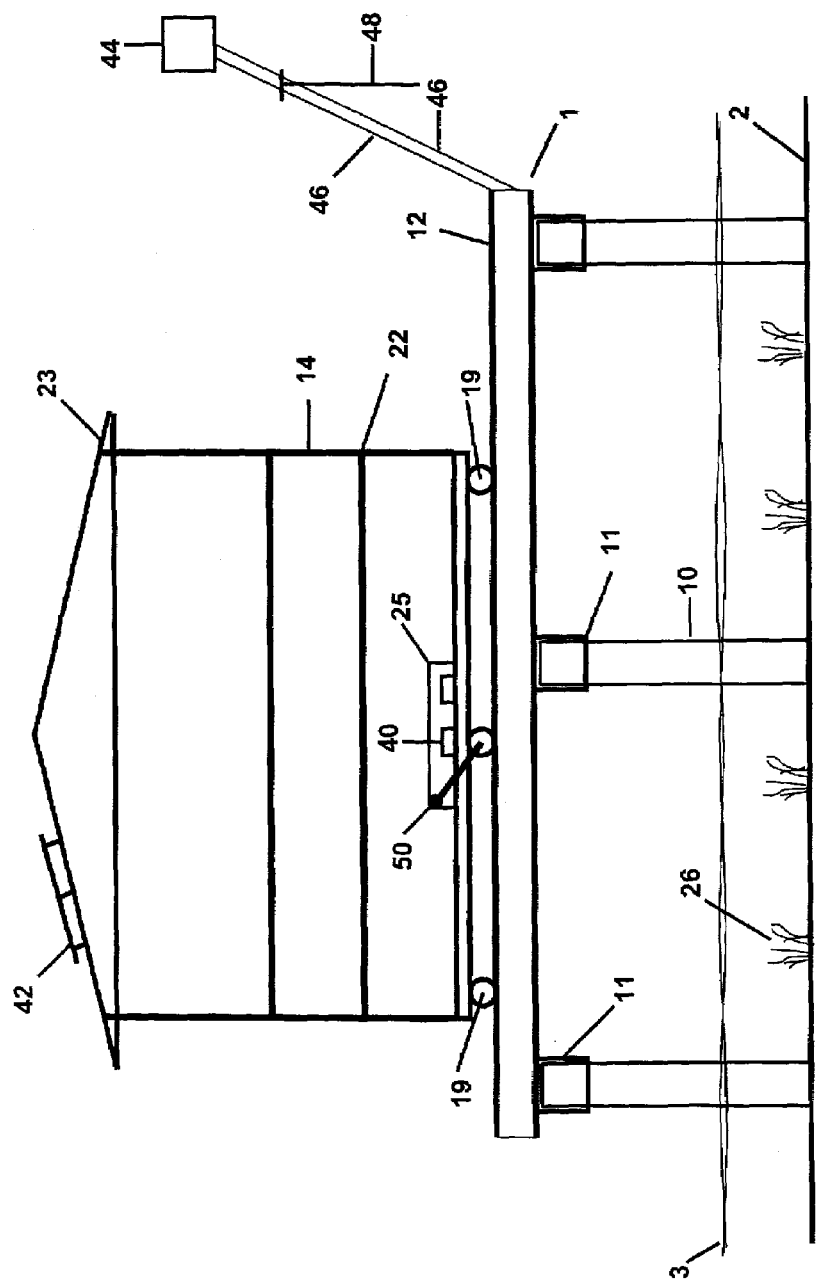
FIG. 1 is a side view of a pier and vehicle utilizing the instant invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Referring generally to the Figures, the present invention is illustrated by use of a pier 1 having a payload transport device 14 to transport people and equipment along the pier. The transport device can assimilate conventional decking on a pier and further include side rails 17, seats 21 and a roof 23. However, the main difference is that the transport device is movable along a payload rail system 12 in which the preferred embodiment is a self-propelled carriage wherein a drive system 25, such as a battery powered electric motor 30.

The support system for the carrier is provided by a plurality of pilings 10 anchored into the sea bed 2 as conventional installed in a lake, waterway or the like body of water 3. Attached to the top portion of the pilings 10 is a support bracket 11 onto which a rail system 12 is secured. In the preferred embodiment, a single piling can be used. However, where a wide decking is desires, parallel pilings can be employed.

The rail system can utilize one or more rails 13. In a preferred, albeit non-limiting embodiment the rails 13, 13' are structural I-beams providing roller coaster type securement wherein the wheels of the carriage can be captured within the I-beam. Circular cross sectional rails, not shown, may also be used. The rails 13, 13' support the vehicle 14 and provide a platform to allow the vehicle 14 to traverse the pier from the land to mooring pilings that a marine craft is secured to, not shown. Since the rails 13, 13' can be formed from a relatively small width, the amount of wind or wave pressure that can be exerted on the structure is minimal. Another advantage of this small support area is that sunlight is permitted to reach the underwater areas located below the support. This has the benefit of allowing vegetation 26 to grow in these areas. If a large storm is predicted, the vehicle can be lifted off the support system and secured to land eliminating all decking surface area from the ravages of wave action. Further, in environmentally sensitive areas, the vehicle can be moved to non sensitive areas, such as deep water. The vehicle may also be moved at different times during the day or week so that if the entire length of the pier system is mounted over sea-grass, no area will be in shade for any length of time.

The vehicle 14 is preferably a self-propelled carriage and can be constructed in various forms. The specific form depends on the needs of the user. For example, a roof 23 may be employed. Specific areas may be provided to securely hold coolers, diving, fishing and boating gear. Also seats 22 may be provided for the people utilizing the carriage. In the illustrated exemplary embodiment, an electric motor 30 is mounted on the carriage chassis and connected to the drive wheels 19 through a mechanical drive train 31. Batteries 32 are used to power the electric motor 30. The batteries are also used to provide power for lights, stereo1 control panel illumination lights and an auxiliary power outlet, all not shown but conventional in the art. The batteries can be charged through a conventional onboard charging system 40 wherein the placement of the carriage against the bulkhead would allow the charger to be "plugged in" in a manner similar to the provision of electricity to a marine craft. Alternatively, the electric motor 30 can be solar powered. Solar panels 42 can be mounted on the roof 23 of the vehicle to provide electricity to the electric motor 30. The solar panels can also be used to provide electricity to the onboard charging system 40. An alternative source of electrictry, for the electric motor 30, can be supplied by a land based power utility 44, as illustrated in FIG. 1. The electricity from the land based utility is delivered to the vehicle through power transmission lines 46 which are supported by poles 48. The electricity is delivered from the transmission lines 46 through the rail system 12 and via electric pick-ups to the electric motor 30.

The drive train 31 is connected to the motor and to the drive wheels via an axle 18. A chain drive or gear 35 is used in the preferred embodiment to connect the motor to the axle with polyurethane or the like not metal wheels for quiet movement that is not effected by the corrosive atmosphere of salt water. Pneumatic tires and solid rubber wheels may also be utilized. The drive train can be motor braked. However, any other suitable braking system may be employed. Further, although a mechanical drive train is employed in the preferred embodiment a hydraulic drive train may also be utilized.

Figure 2:
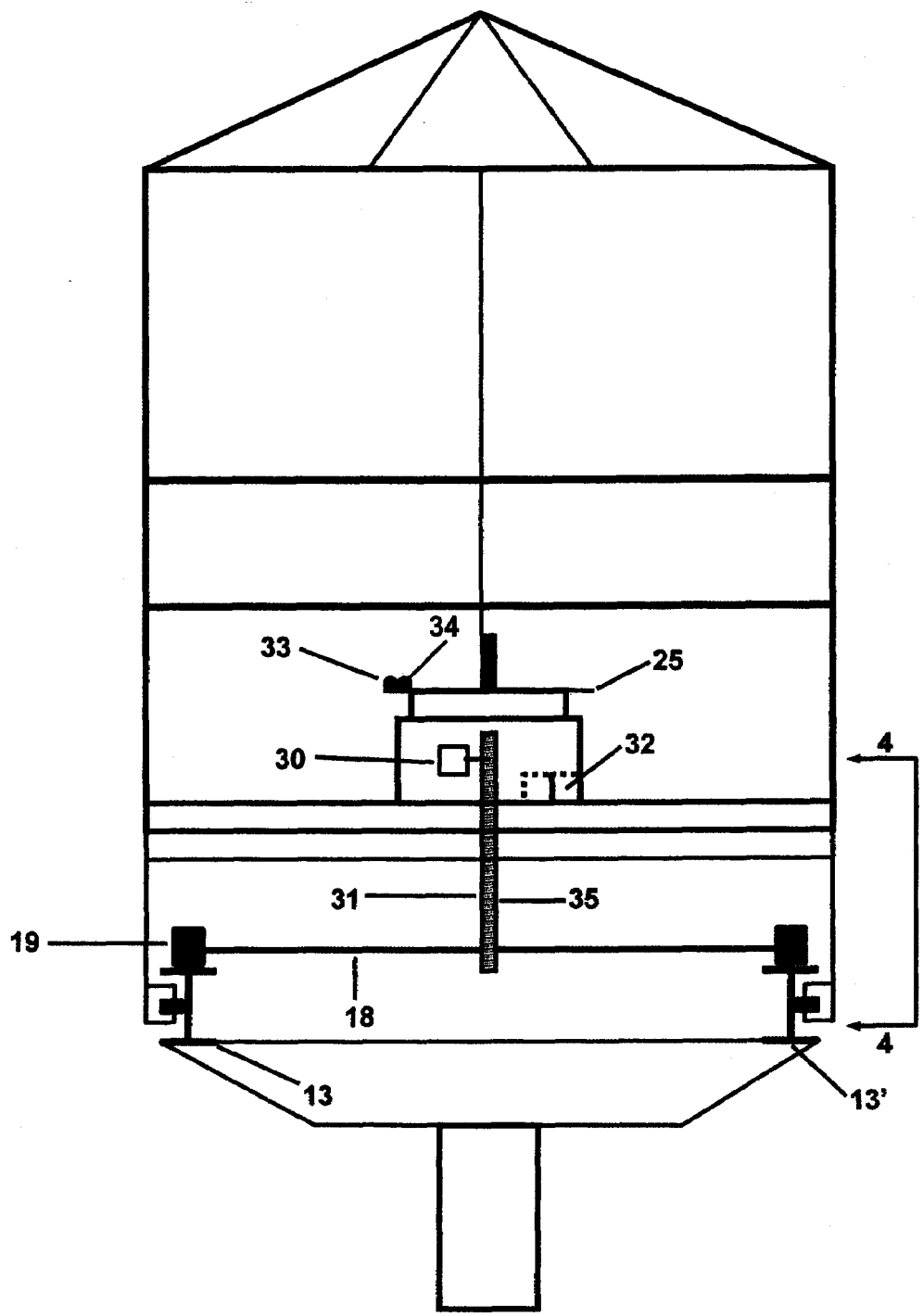
FIG. 2 is a cross sectional view of FIG. 1, illustrating one embodiment of the instant invention.
Figure 3:
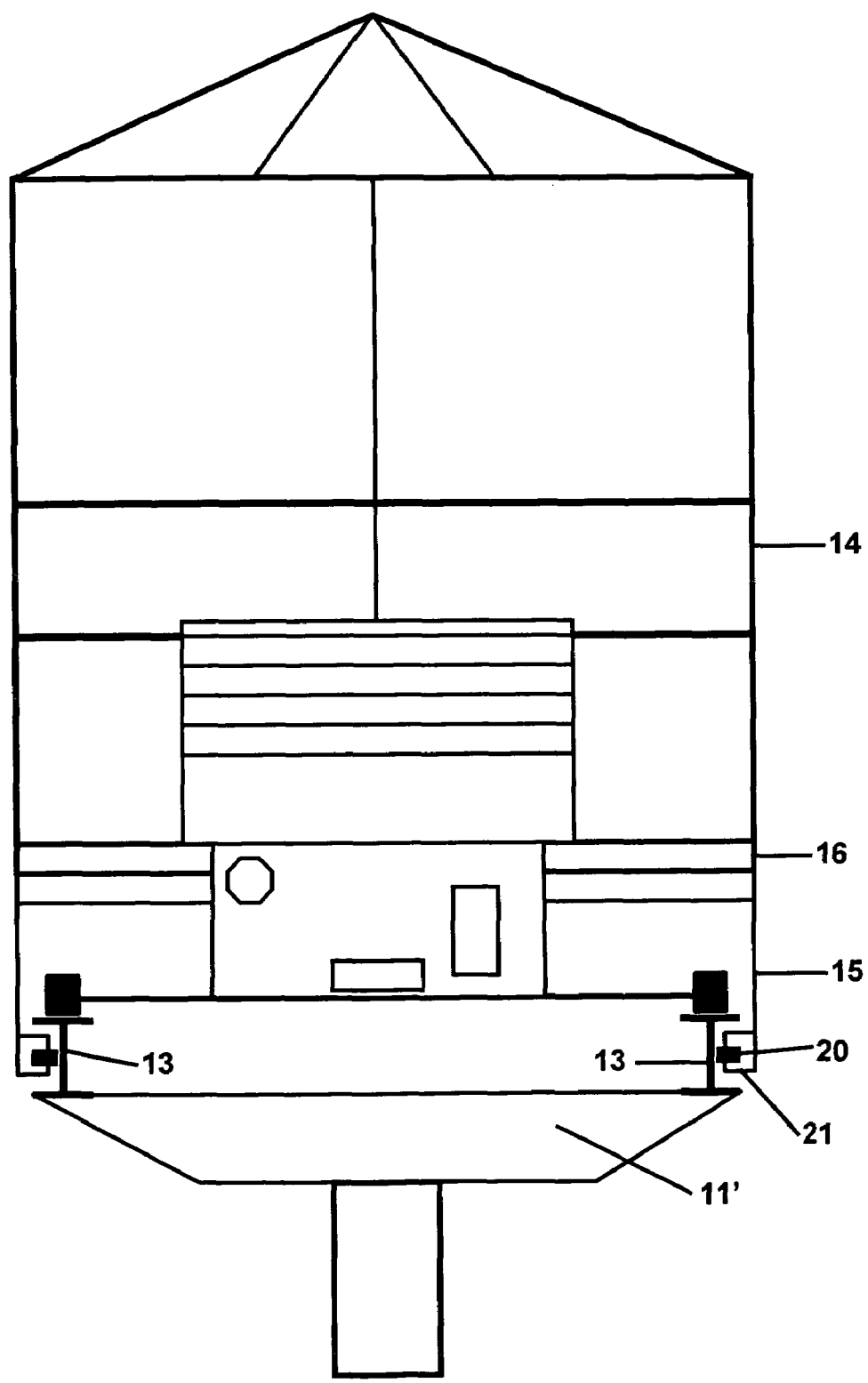
FIG. 3 is a cross sectional view similar to FIG. 2, illustrating an alternative embodiment of the instant invention.
Figure 4:
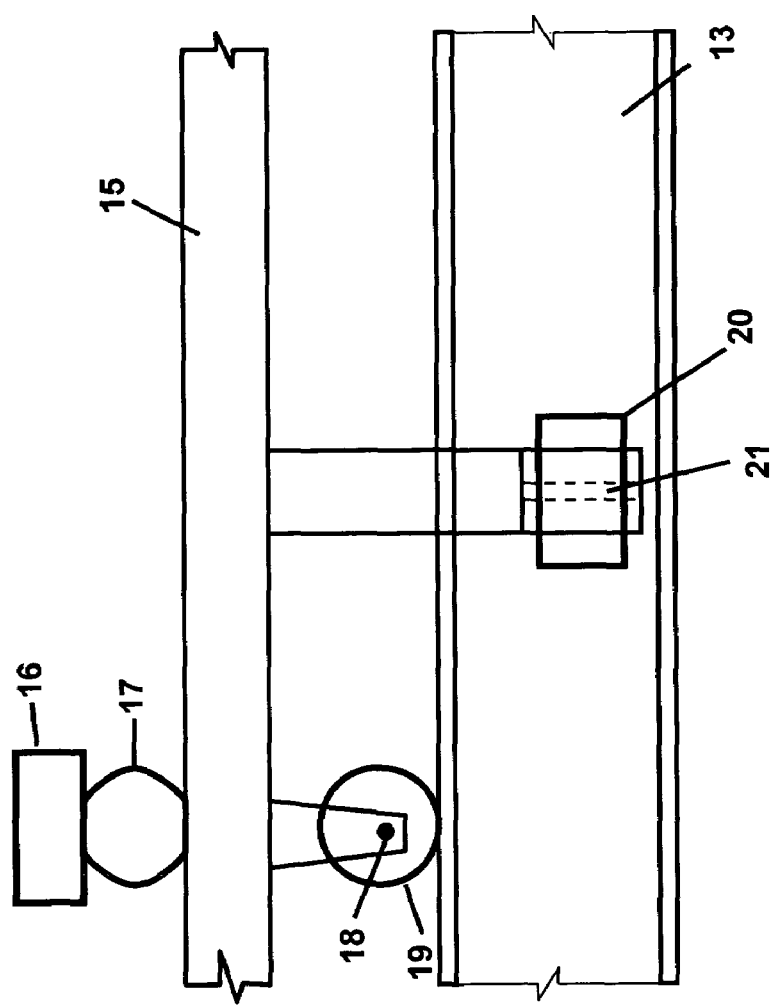
FIG. 4 is a partial cross sectional view along lines 4-4 of FIG. 2.

The carriage chassis includes two longitudinal frame members 15 as best seen in FIG. 4. Located above these are the transverse frame members 16. Suspension means 17 connect the longitudinal and transverse frame members. In the preferred embodiment pneumatic shock absorbers are used for the suspension means. Attached to the transverse frame members is the carriage 14. The motor and drive train are mounted on a transverse frame member in the preferred embodiment. Each longitudinal frame member includes axles 18 on which are mounted the wheels 19. The wheels, in turn, roll on top of the rails 13. As shown in FIG. 1 there are three sets of wheels. The center set is driven by the drive train and the other sets are for support of the vehicle. As few as two sets of wheels may be employed, with one set being driven. The longer and heavier the vehicle, the more sets of wheels that are required. To provide stability, castors 20 are mounted to the longitudinal frame 15. They are mounted with their axis 21 substantially perpendicular to the axis 18 of the drive wheels 19. They engage the side face of the rails for lateral stability and alignment as shown in FIGS. 2, 3 and 4.

The motor and drive train are mounted on the carriage on or above a transverse frame in the preferred embodiment as shown in FIG. 1. They could also be mounted on the longitudinal frames of the vehicle as shown in FIG. 3.

In the event of a failure of the motor, a manual propulsion system is provided to drive the carriage. In one embodiment the motor is disengaged from the drive train and set to "free wheel" and a pole is utilized to move the vehicle along the pier. A hand crank 50 may also be used to drive the drive train after the motor is disengaged therefrom, which in turn will propel the vehicle along the pier.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A pier comprising:
    a plurality of support members having a proximal end and a distal end;
    said distal end constructed and arranged to be mounted to a ground surface below the surface of a waterway;
    at least one payload transport device;
    at least one payload traversal means;
    said payload traversal means connected to a shoreline at one end thereof and having the other end located in said waterway;
    said proximal end of said support members constructed and arranged for mechanical engagement with said at least one payload traversal means;
    said payload transport device constructed and arranged for reciprocal translational movement along a longitudinal axis of said payload traversal means;
    said payload transport device including a propulsion system;
    said propulsion system powered by an electric motor;
    means to mount said payload transport device on said payload traversal means;
    a drive train connected to said electric motor and said means to mount said payload transport device;
    said means to mount said payload transport device including a transverse frame on which said payload transport device is mounted, a longitudinal frame mounted between said transverse frame and said payload traversal means, suspension means mounted between said transverse frame and said longitudinal frame, and wheel means for mounting said longitudinal frame onto said payload traversal means;
    said wheel means comprising support wheels mounted between said longitudinal frame and the top of said payload traversal means for supporting the weight of the payload transport device and driving said payload transport device along said payload traversal means and stability wheels mounted between said longitudinal frame and at least one side of said payload traversal means for providing lateral stability of said payload transport device;
    and controls connected to the electric motor to control the speed and direction of the motor, which in turn will control the speed and direction of said payload transport device.

2. The pier in accordance with claim 1 wherein said propulsion system is manually operable.

3. The pier in accordance with claim 1 wherein said electric motor is solar powered.

4. The pier in accordance with claim 1 wherein said controls are mounted integral to said payload transport device.

5. The pier in accordance with claim 1 wherein said payload transport device is movable to avoid environmentally sensitive areas.

6. The pier in accordance with claim 1 wherein said payload transport device can be detached from said support means to prevent exposure during periods of high winds or waves.

7. The pier in accordance with claim 1 wherein the drive train is a mechanical drive train.

8. A pier in accordance with claim 1 wherein the drive train is a hydraulic drive train.

9. The pier in accordance with claim 1 wherein said electric motor is operated by batteries.

10. The pier in accordance with claim 9 including a battery charger for converting land based power.

11. The pier in accordance with claim 9 wherein said batteries are recharged by solar energy.

12. The pier in accordance with claim 1 wherein said electric motor is supplied power from land based utilities.

* * * * *